Aug. 16, 1966  R. RUFFER  3,266,310
COMPENSATING MEANS FOR A METER SUCH AS A GAS METER
Filed March 24, 1964  3 Sheets-Sheet 1

INVENTOR.
RUDOLF RUFFER
BY Burgess, Dinklage, & Sprung

Aug. 16, 1966   R. RUFFER   3,266,310
COMPENSATING MEANS FOR A METER SUCH AS A GAS METER
Filed March 24, 1964   3 Sheets-Sheet 2
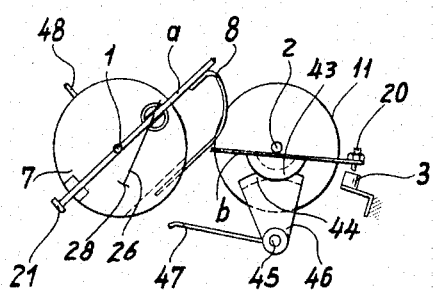
Fig. 3a.
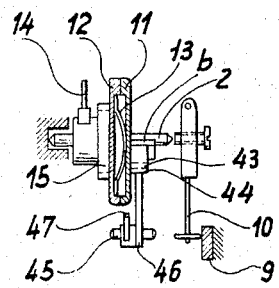
Fig. 3c.
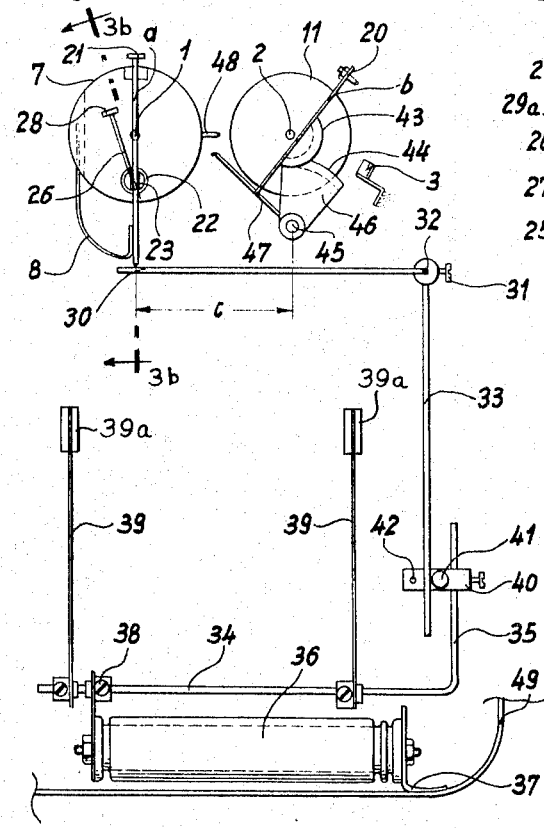
Fig. 3b.
Fig. 3.
INVENTOR.
RUDOLF RUFFER
BY
Burgess, Dinklage & Sprung
ATTORNEYS.

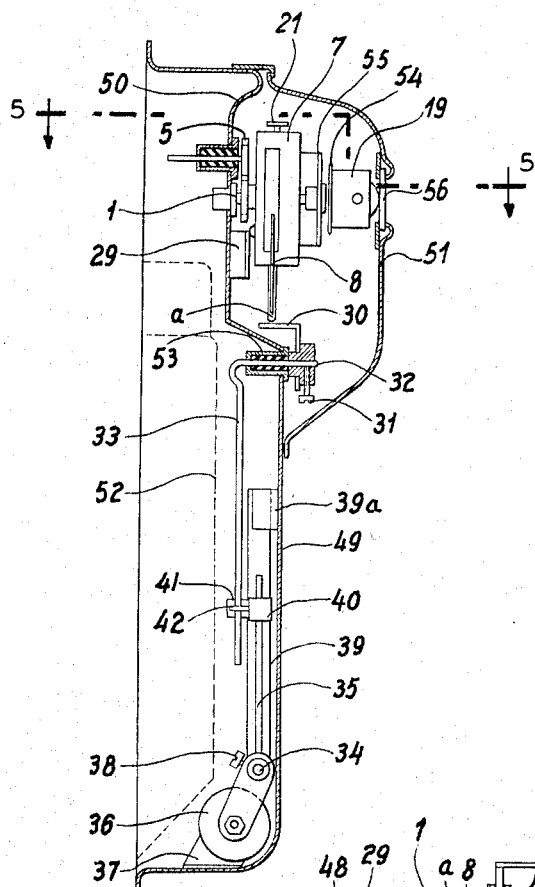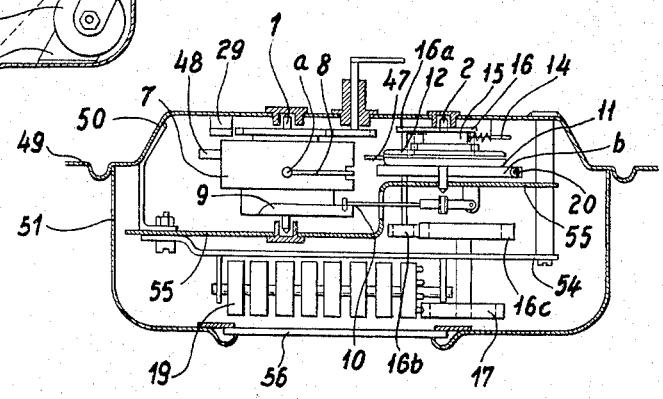

United States Patent Office 3,266,310
Patented August 16, 1966

3,266,310
COMPENSATING MEANS FOR A METER
SUCH AS A GAS METER
Rudolf Ruffer, Mainz-Kastel, Germany, assignor to Elster & Co., A.G., Mainz-Kastel, Germany, a corporation of Germany
Filed Mar. 24, 1964, Ser. No. 354,830
Claims priority, application Germany, Nov. 9, 1962, R 33,853; Mar. 26, 1963, R 34,807
24 Claims. (Cl. 73—233)

This application is continuation-in-part of application Serial Number 317,415, filed October 21, 1963, now abandoned.

The present invention relates to variable ratio transmissions, especially for use as corrective drives to allow for varying factors in measuring or controlling services, and the like.

Such transmissions are known and many different types are in use. One disadvantage of the prior art designs is the considerable amount of energy it takes to actuate them, which in many practical applications, especially in the field of measurement and control, is excessive and hence becomes a source of error. A further disadvantage is the great amount of space required by these drives, resulting in undesirably large size of the apparatus in which they are used.

By the present invention, a transmission with variable ratio is created, in which the actuating energy required is minimal, and which consequently is especially suitable in cases where naught but slight actuating energy is available. Further, the transmission is characterized in that it requires but a small amount of space.

The invention involves the use of two pivot mounted levers disposed with a constant distance between their pivot points, the levers serving as driving and driven parts. One of the levers, preferably the driving lever, has a variable effective length adjustable in accordance with a secondary input or variable influencing factor, and this lever is set in rotation by the primary input magnitude with respect to which it is desired to superimpose correction, while the other lever, preferably the driven lever, has a constant effective length, and is under the influence of a restoring force. For each rotation of the primary input, the driven lever is driven from its starting position by an angular amount which represents the corrected transmission ratio. A clutch secured against reverse rotation can be installed on the output side of the driven lever, and control means can be provided by which this clutch is engaged shortly before the beginning of the driving of the driven part, and is disengaged shortly after the driving ceases to drive the driven part.

Thus, the invention provides a transmission which comprises a driving lever and a pivot mounting for this driving lever which provides the driving member for rotation about the pivot mounting. The driving lever extends outwardly from the pivot mounting to termination in a working end, and the driving member is adjustable in its mounting so that the effective length extending from the mounting to the working end can be selectively adjusted. Also included is a driven member and a pivot mounting for the driven member, the pivot lever extends from its pivot mounting to termination in a free end. The driven member is disposed in the path of the driving lever upon rotation of the driving lever so that the working end portion of the driving lever engages and pivots the driven lever about its pivot mounting, upon each revolution of the driven lever. The angle α through which the driving lever so pivots the driven lever depends on the effective length of the driving lever. The apparatus further includes primary input means for rotating the driving lever about its pivot mounting, and transmission output means operatively connected with the driven lever for operation thereof in response to movement of the driven lever by the driving means. Thus, with the apparatus of the invention, the response of the output means to the operation of the input means can be varied by adjustment of the effective length of the driving lever.

In a preferred embodiment of the invention, constant automatic adjustment of the effective length of the driving lever is provided by a correction factor transducer. The performance of this adjustment, which requires the highest accuracy and absolute reproducibility, is in many cases made difficult by the extremely limited amount of space available, as for example in the case where it is desired to house a corrective transmission with all its accessories in the space available in an ordinary residential gas meter, to be used as a volume converter.

In this preferred embodiment, the pivot mounting for the driving lever includes a supporting element for the driving lever, and this element has a bore extending therethrough, wherein the driving lever is slidably received. Means are provided for securing the driving lever in place in this bore, and, further, means are provided for releasing the driving lever for movement in the bore. As the driving lever is rotated by the primary input means, during a segment of each revolution, the working end of the driving lever is engaged with the driven lever, and the working end of the driving lever is disengaged from the driven lever during the remaining segment of each revolution. The apparatus includes a driving lever adjustment member positioned for engagement by the driving lever during the disengagement segment of each revolution of the driving lever. The adjustment member is provided for adjusting the position of the driving lever in the bore in the supporting element. The said securing means is operative to secure the driving lever in the bore at the position provided by the adjusting member until disengagement of the working end of the driving lever with the driven lever, and the release means provides the driving lever after disengagement of the working end thereof with the driven lever, in position for adjustment thereof by the adjustment member. Control means, such as a transducer, are provided for controlling the position of the adjustment member.

Desirably, the axis of rotation of the driving lever and the axis of the pivot mounting of the driven lever are disposed parallel to each other and horizontally. The apparatus can then be provided so that upon operation of the release means which releases the driving lever for sliding movement, in the bore of the supporting element for the driving lever, the driving lever drops under the influence of gravity into engagement with the adjusting member. Then, as the driving lever continues to rotate, the adjusting member pushes the driving lever upwardly in the bore of the supporting element to a height depending upon the position of the adjusting member. The securing means then becomes operative to secure the driving lever in the bore, and retains the driving lever in this position during further revolution of the driving lever until the driving lever has engaged the driven lever, and moved the driven lever through the angle α, whereupon the release means can operate to again permit the driving lever to drop in the bore.

By this preferred design of the invention, it is made practical to install the parts of the apparatus at separated points. Thus, where the apparatus is used in combination with a gas meter, the various parts of the apparatus can be positioned with respect to the working elements of the gas meter at convenient locations. Thus, a gas meter commonly includes a vertically extending measuring chamber, an outer casing spaced from the measuring chamber, and a counting mechanism mounted on the casing in a housing therefor at the top portion of the casing. Where it is desired to utilize a transmission according to the invention in combination with such a gas meter, the transducer can be disposed in the lower corner of the casing between the measuring chamber and the casing, the driving arm and its supporting element and the driven arm and its transmission output means can be disposed in the counter housing, and the linkage between the transducer can be disposed in the casing between the casing wall and the measuring chamber. Advantageously, this linkage can be positioned in one of the vertically extending corners of the casing.

Desirably, parts of the apparatus of the invention are mounted on the inner surface of the casing, and the apparatus of the invention can be combined with the casing, the counting mechanism housing and the counting mechanism, as a unit so that a counting mechanism outfitted with a transmission according to the invention can be mounted as a unit on a gas meter measuring chamber. The construction described here is particularly advantageous when utilized in combination with a bellows gas meter having a vertically divided casing.

The invention is further described in the accompanying drawings, wherein:

FIG. 3 is a schematic representation of a preferred embodiment of the invention, wherein the parts of the transmission are disposed in an array particularly suitable for a combination of the transmission of the invention and a conventional household gas meter, in elevation;

FIG. 3a is a view of a portion of the transmission shown in FIG. 3 and showing the parts in a different operating position;

FIG. 3b is a cross-section taken along line 3b—3b, in FIG. 3;

FIG. 3c is a cross-section view, in elevation, showing a clutch arrangement for transfer of the output of the driven lever to an instrument such as a counting device;

FIG. 4 is a side elevation view, in cross-section, of a gas meter outfitted with a transmission according to the invention; and FIG. 5 is a cross-sectional view taken along line 5—5 in FIG. 4.

In the various views of the drawings, like reference characters indicate corresponding parts.

Figure 1:
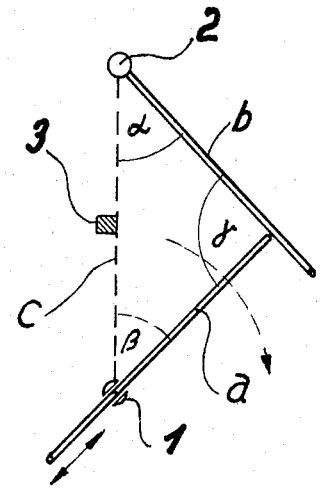
FIG. 1 is a schematic representation of the geometric basis for the invention.

Referring to FIG. 1, the letters $a$ and $b$ designate two levers whose axes of rotation have the constant spacing $c$. Lever $a$ is the driving lever. It has a variable effective length whose adjustment is performed manually or by an actuating means in accordance with a variable influencing factor, and it is placed in rotation by the input to be corrected, through a shaft (e.g., through a counting mechanism driving shaft of a device for measuring number of revolutions).

The correction factor actuating means can be any measuring, indicating or controlling apparatus which supplies an adjusting factor proportional to the variable influencing factor, such as a so-called power thermometer (temperature or differential temperature transducer), a pressure or differential pressure transducer, a pressure totalizing (e.g., absolute pressure) transducer, a transmitter for a volume-reduction factor such as a standard gas pressure tank, a quotient computer, or the like, to mention only a few of the practical applications of the invention in connection with the measurement of gas volume with correction for the state of the gas, with the measurement of caloric content, etc.

Lever $b$ is the driven lever. It is rotatable about the axis 2 and has a constant length, and the arrangement is such that the total effective length of the two levers is greater under all circumstances than the distance $c$ between their axes of rotation, so that each rotation of lever $a$ must result in an engagement of lever $b$.

Lever $b$ is under the effect of a restoring force which may consist of a spring or in its own weight. In its path of movement, and preferably in a plane passing through the two axes of rotation, there is disposed a stop or the like 3. This stop provides a first or starting position into which the lever $b$ drops or snaps back under the effect of the abovementioned restoring force, as lever $a$ continues to rotate after ceasing to drive lever $b$.

The clutch system mentioned above is located at the extremity of lever $b$ that is associated with its axis of rotation 2 (see description of FIG. 2 below). Most simply, it consists of a free-wheeling clutch whose secondary side transmits the motion corrected by the transmission and is secured against counter-rotation by braking means, and whose primary side is turned back by lever $b$ after the latter ceases to be driven, until it has returned to its starting position against stop 3.

An ordinary friction clutch or the like can, of course, also be used for this purpose, the operating lever of such a clutch being operated for engagement or disengagement by controlling members (cams) rotating together with the transmission lever $a$, and the secondary side being secured against reversal by braking means in the manner mentioned above.

The manner of operation of the invention is immediately apparent. If the effective length of lever $a$ is increased by a change in the influencing factor to be allowed for, the angle of engagement $\alpha$ (the angle through which the driven arm $b$ moves from the first or stop position to its second position which depends on the effective length of the driving arm $a$) of lever $b$, beginning at the stop 3, increases, and the transmission ratio to be transmitted changes from $360/\alpha$ to $360/(\alpha+\Delta\alpha)$.

It can be proven mathematically that the ratio between the length change $\Delta a$ and the angle change $\Delta \alpha$ resulting therefrom has a characteristic that remains nearly enough linear over a wide range. And since this range is substantially the same as that within which such a characteristic is required in the cases to be taken into consideration, there are a corresponding number of applications open to the invention.

Figure 2:
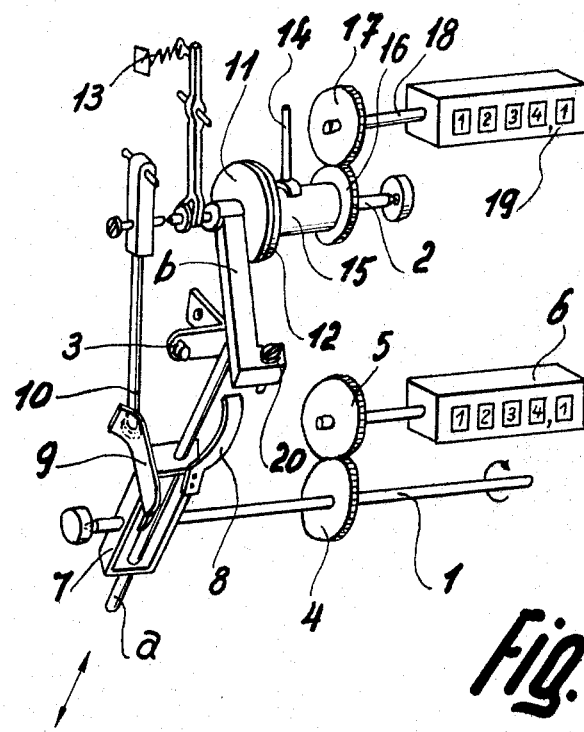
FIG. 2 is a perspective view of an embodiment of the variable ratio transmission according to the invention.

In the embodiment shown in FIG. 2, driving lever $a$ receives its drive from a shaft 1 which, by means of a pair of gears 4 and 5, also drives a counting or indicating mechanism 6 for the primary input or uncorrected measuring or controlling factor. It is mounted crosswise to the axial direction of shaft 1 in a frame or the like 7 mounted on the shaft and rotatable therewith, and lever $a$ is longitudinally displaceable in this mount. On the frame 7 there is a cam or the like 8 which serves to prevent the danger of an excessive initial acceleration of lever $b$ by a lever $a$, that is, to afford a shockless start and a gradual lifting of lever $b$ to the point where it ceases to be driven. The free end of the cam member 8 lies within a circle whose radius is determined by the smallest effective length of lever $a$ that can occur in practice.

Furthermore, the mounting frame 7 of a lever $a$ bears a controlling member 9 curved at both its extremities, which cooperates with the engaging lever 10 of a clutch 11–12 mounted on axis 2 and serving for the transmission of the angle of rotation of lever $b$. This member 9 serves the purpose of operating engaging lever 10, against the effect of a spring 13, to produce a clutch engagement shortly before the beginning of the driving of lever $b$ by lever $a$, and then, shortly after the end of the displacement of lever $b$, to release this engaging lever again. Thereupon spring 13 disengages the clutch. The purpose of the indicating spring arrangement can also be served by a simple spreading spring inserted between the two clutch parts 11 and 12. If desired, a free-wheeling clutch arranged so that its input side rotates in both directions with the driven lever $b$, can be used.

Lever $b$ here is rigidly affixed to the hub of the clutch member 11, and the arrangement is such that lever *b*, after the cessation of the drive by lever *a* and the release of the clutch 11–12, drops back of its own weight into the starting position against stop 3, while the clutch member 12 is secured against reversal, along with the following members 15, 16, 17 and 18 of the drive train and with the counting or indicating mechanism 19, by means of a brake or the like 14 which is loaded by a weight or a spring. This brake can be such that it is overridden when the driven shaft is moved from its first position where it engages the stop 3 to its second position which depends on the effective length of the driving arm *a*.

Stop 3 is here formed by a small magnet. It serves as a safety device to prevent the falling lever *b* from coming to a halt before it reaches the stop. An extremely weak magnetic field suffices for this purpose, so that the influence of this magnet on the driving of lever *b* by a lever *a* remains negligibly slight. An adjusting screw 20 provided on the free end of lever *b* permits the precise adjustment of its starting position at the beginning of its engagement by lever *a*.

In variation of the embodiment described, the guiding member 8 can also be mounted directly on lever *a* or can be designed as an appropriately curved portion of this lever. Also in the case of the controlling cam 9 of the clutch engaging lever 10, it too can be mounted directly on lever *a*. In the case of apparatus with remote transmission of the corrected drive, the arrangement remains substantially as described; in that case, an impulse transmitting disc or the like can be provided in place of the transmitting members 16, 17 and 18, or in addition thereto.

The adjustment of the effective length of lever *a* can be performed manually or by a transducer arranged to transmit a signal to the driven arm *a* so as to effect the desired correction in the input to the transmission.

A preferred embodiment of the invention is shown in FIGS. 3–3*c*. The lever *b* is mounted on the disc 11, which forms the one side of a transmission clutch 11–12 (FIG. 3*c*). The stop 3, which determines the starting position of the driven lever *b*, as in the case of the embodiment of FIG. 2 is a magnet which cooperates with an adjusting screw provided on the free end of lever *b*.

The supporting element 7, on which the driving lever *a* is displaced by the correction-factor transducer transversely of shaft 1, is here constituted by a round body bored through diametrically, in whose bore the lever *a* can slide by the force of gravity as far as a stop 21. A hook-shaped ramp member 8 which is mounted on lever *a* and also has a bearing in element 7, and which is displaceable together with lever *a*, corresponds to the cam member 8 in FIG. 2, and serves to assure a shock-free starting and a gradual lifting of the driven lever *b* when it is engaged by lever *a*.

In the supporting element 7 there is installed a braking device by which this lever is secured each time its effective length is corrected, for a subsequent cooperation with lever *b*. As shown in FIG. 3*b*, this braking device is located in a hole 22 and consists here of a pin 24 which is under the influence of a spring 23 and has a bore 25 through which the lever *a* is passed with clearance. The brake member is urged by the pressure of spring 23 against the lever *a*, and the latter is urged against the wall of the bore in which it is received in element 7, so that the lever *a* is unable to perform any longitudinal movements in its mounting.

A brake release 26 serves as means for the engagement and disengagement of this braking device, said lever also cooperating with the spring 23 and the brake member 24. It extends from the bore 22 to beyond the axis 1 of supporting element 7 in a recess 27, and bears a roller 28 on its free end. The lever 26 can be secured to the pin 24 and its fulcrumed end 26*a* is movably mounted in a recess in the supporting element 11 so as to permit pivoting of the lever about the fulcrum, for operation thereof. The roller 28 cooperates with a controlling ram 29 which is secured to a housing 29*a*, in which the transmission device of the invention can be housed. The ramp 29 lies in the path of the roller 28, and each time the roller runs onto the ramp 29, lever 26, and with it the pin 24, is pushed back against the action of spring 23, and thus lever *a* is released for the adjustment of its effective length, while, when the roller runs back down off the ramp 29, lever *a* is again held fast by the brake member 24. The arrangement of the controlling ramp 29 is such that the release of lever *a* takes place at the termination of cooperation of the two levers *a* and *b*, i.e. approximately at a position of lever *a* in which it points downward to the right at an angle of 45°. Further, the ramp 29 is of such length that the roller 28 leaves the ramp when the driving lever *a* is disposed vertically.

An adjusting arm 30 controlled by the correction-factor transducer serves as a means for the adjustment or correction of the effective length of lever *a*, the latter running onto the adjusting arm when it swings downward after being released. In this movement it first achieves a length exceeding the maximum adjustment, and thus is pushed back as it continues to rotate, until it finally achieves the proper effective length as it comes into a position about perpendicular to the adjusting bar 30 (FIG. 1).

The adjusting bar 30 is mounted on the pivot pin 32 of a link arm 33 so as to be adjustable by a screw 31; it thus forms together with the said lever a bell crank 30–32–33, which is controlled in turn by the correction-factor transducer through a transducer response arm 34 having an upturned finger 35. The correction factor transducer, where here is a bellows tube 36 filled with a standard gas and serves in the conventional manner to supply on the basis of its variable length a dimension representing the volume conversion factor (value Z), is mounted fixedly at one end, at 37. Its freely movable end is connected at 38 in an adjustable manner to the arm 34, which here is suspended in a preferred manner from two leaf springs 39 which can be secured to a housing by supports 39*a*. The movement of the arm 34 is transmitted through a linkage to link arm 33.

On account of the high degree of accuracy required, the linkage should not have free play nor offer resistance. To meet these requirements, a round magnet 41 disposed across lever arm 33 and fastened to arm 35 at 40 so as to be adjustable for height, is used as the linkage device, so that the contact between link arm 33 and finger 35 is always a point contact, and this magnet is placed on that side of finger 35 to which link arm 33 of the bell crank is urged by the force of gravity. This is the same direction in which the loading occurs on the adjusting bar 30 during the automatic adjustment of the effective length of lever *a*. This also excludes any play in the articulation between arms 33 and 35.

As an additional measure of security, a stop 42 can be provided on the articulation system to prevent the lever arm 33 from moving further away from magnet 41 than the distance from which the force of the latter suffices to pull it back again. The longitudinal adjustability of the articulation device on arm 35 makes it possible to compensate for the difference in the elastic constants of the bellows tube serving as the correction factor transducer.

In the engagement of lever *b* by lever *a*, the cam (hook 8) of the latter encounters lever *b* (FIG. 3*a*), whereupon the latter is lifted away from the stop (magnet 3) and the associated counting mechanism is turned correspondingly further. In the embodiment of FIG. 2, the return of the driven lever *b* to its starting position, which then follows, is performed under the effect of a spring or of its own weight. This type of return, however, is not a positive one, and if lever *b* should for any reason stick in its free end position, lever *a* would run through freely and the counting mechanism drive would be interrupted. Therefore, means whereby the return of lever *b* is rendered positive, are provided.

These means consist of a pair of intermeshing ring gears 43–44 (FIG. 3a), one of which is mounted on lever *b* and the other on rocker 46 mounted pivotally at 45, and of a balance lever 47 rigidly affixed to the said rocker, the free end of which lies in the path of movement of a driver 48 provided on the supporting element 7. By means of this balance lever 47, which is shown in its starting position in FIG. 3, the two gears 43 and 44 are pivoted on their pivot points until the free end of lever *b* (determined by adjusting screw 20) is located a short distance, i.e, about half a millimeter, away from the end stop at magnet 3 by which it is then pulled into its starting position. When lever *b* is again engaged by hook 8 and lever *a*, the balance lever 47 is brought through gears 43 and 44 back into the position shown in FIG. 3, in order once again to cooperate with the driver 48.

FIGS. 4 and 5 show the manner in which the corrective transmission and its controls can be contained in a bellows-type gas meter with a vertically divided housing. The front wall of the casing is designated as 49 and 50 and serves simultaneously as a cover. As is customary in these meters, upper portion 50 of the casing forms a deep pan which receives the counting mechanism, this pan being covered externally by a cap 51 provided with a viewing window.

In the bottom corner of the casing between the measuring chamber 52 and the casing wall, the correction factor transducer 36 is positioned and is mounted rigidly on the casing at one end at 37. The control rod 34 is mounted in a longitudinally displaceable manner in the same bottom corner and is supported by arms 39, while its finger 35, and the link arm 33 cooperating therewith through articulation 40–41, are contained in a vertically extending corner left free by the measuring chamber 52. These parts, therefore, require no more space than has hitherto been left unused in the casing enclosing the chamber 52 through which the substance being measured flows in bellows type gas meters.

The pivot end 32 of lever 33 is received in seal 53 where it passes through the wall 49. The adjusting arm 30, along with the lever transmission *a–b* and the counting mechanism 19, is housed in the basin-shaped upper portion 50 of the wall, and is protected by the counting mechanism cover 51.

A separate meter for recording the uncorrected values, such as counter 6 in FIG. 2 can be dispensed with, as such a counter is needed only for embodiments in which the uncorrected values are to be recorded in addition to the recording of corrected values, the counting mechanism 19, by which the corrected magnitudes are recorded, is mounted on plate 54. An intermediate plate 55 is provided for mounting on the lever drive *a–b* and the accessories of the latter. The drive of gear 17 of the counting mechanism by clutch plate 12 and bearing sleeve 15 is by way of the gear train made up of gears 16, 16a, 16b and 16c. The meter can be read through window 56.

An advantage of the device of the invention is that a unit made up of the casing 49, 50, the counter mechanism 19, and the counter mechanism housing 51, and the transmission of the invention as it is shown in FIG. 4 and FIG. 5, can be mounted on a gas meter measuring chamber. Alternatively, if a transmission according to the invention is not desired, a unit similar to that just described except not outfitted with a transmission according to the invention, can be installed on the measuring chamber.

A further advantage of the device of the invention is that the link arm can be long so that little power is required for operation of the adjusting arm 30, and wear on the seal 53 (FIG. 4) can be maintained at a very low level.

While the invention has been described with respect to particular embodiments thereof, these embodiments are merely representative, and do not serve to set forth the limits of the invention.

What is claimed is:
1. Transmission comprising:
 (a) a driving lever and a pivot mounting for said driving lever providing it for rotation about the pivot mounting, the driving lever extending outwardly from the pivot mounting to termination in a working end,
 (b) a driven lever and a pivot mounting for said driven lever, the driven lever extending from its pivot mounting to termination in a free end, the driven lever being disposed in the path of the driving lever upon rotation of the driving lever so that the working end portion of the driving lever engages and pivots the driven lever about its pivot mounting, the angle $\alpha$,
 (c) one of said levers being adjustable in its mounting so that the effective length extending from the mounting to the working end thereof can be adjusted and the magnitude of the angle $\alpha$ depends on said effective length,
 (d) primary input means for rotating the driving lever about its pivot,
 (e) transmission output means operatively connected with the driven lever for operation thereof in response to movement of the driven lever by the driving lever,
whereby response of the output means to the operation of the input means can be varied by adjustment of the effective length of the driving lever.

2. Transmission comprising:
 (a) a driving lever and a pivot mounting for said driving lever providing it for rotation about the pivot mounting, the driving lever extending outwardly from the pivot mounting to termination in a working end, said driving lever being adjustable in said mounting so that the effective length extending from the mounting to the working end can be selectively adjusted,
 (b) a driven lever and a pivot mounting for said driven lever, the driven lever extending from its pivot mounting to termination in a free end, the driven lever being disposed in the path of the driving lever upon rotation of the driving lever so that the working end portion of the driving lever engages and pivots the driven lever about its pivot mounting, upon each revolution of the driving lever, the angle $\alpha$ through which the driving lever so pivots the driven lever depending on the effective length of the driving lever,
 (c) primary input means for rotating the driving lever about its pivot,
 (d) transmission output means operatively connected with the driven lever for operation thereof in response to movement of the driven lever by the driving lever,
whereby response of the output means to the operation of the input means can be varied by adjustment of the effective length of the driving lever.

3. Transmission with variable ratio comprising:
 (a) a driving lever and a pivot mounting for said driving lever providing it for rotation about the pivot mouning, the driving lever extending outwardly from the pivot mounting to termination in a working end, said driving lever being adjustable in said mounting so that the effective length extending from the mounting to the working end can be selectively adjusted,
 (b) a driven lever and a pivot mounting for said driven lever, the pivot mounting of the driven lever being at a fixed distance from the pivot mounting of the driving lever, the driven lever extending from its pivot mounting to termination in a free end, the driven lever being disposed in the path of the driving lever upon rotation of the driving lever so that the working end portion of the driving lever engages and pivots the driven lever about its pivot mounting, upon each revolution of the driving lever, the angle α through which the driving lever so pivots the driven lever depending on the effective length of the driving lever, (c) the driven lever being movable between a fixed first position in which it is disposed for engagement thereof as aforesaid by the driving lever, and a second position corresponding to the said angle α, (d) the driven lever being returnable to said first position following movement of the driven lever through said angle α, for engagement of the driven lever by the driving lever upon the next rotation of the driving lever, (e) primary input means for rotating the driving lever about its pivot, (f) transmission output means and a clutch having its input side operatively connected to the pivot mounting of the driven lever, and its output side operatively connected to said output means for actuation of the output means in response to movement of the driven lever through said angle α, whereby response of the output means to the operation of the input means can be varied by adjustment of the effective length of the driving lever.

4. Apparatus according to claim 3, wherein means are provided for rendering the clutch disengaged during said return of the driven lever to said first position, and for rendering the clutch engaged during movement of the driven arm through said angle α.

5. Apparatus according to claim 3, the primary input means comprising a rotatably mounted shaft, said pivot mounting of the driving lever comprising a frame mounted on the said shaft and disposed crosswise thereof, the driving lever extending through the frame and also crosswise of said shaft, the working end portion of the driving lever projecting from one end of said frame and the other end portion of the driving lever projecting from the other end of said frame, whereby the effective length of the driving lever can be selected by movement of the driving lever in said frame.

6. Apparatus according to claim 3, and including means connected to the driving lever and for engaging the driven lever in advance of engagement of the driven lever by the driving lever and gradually accelerating the driven lever.

7. Apparatus according to claim 5, and including means attached to said frame for engaging the driven lever in advance of engagement of the driven lever by the driving lever, to gradually accelerate the driven lever.

8. Apparatus according to claim 3, and including a stop disposed for engagement by the driven lever while the driven lever is in said first position, said stop including a magnet for yieldingly restraining the driven lever in said first position.

9. Apparatus according to claim 4, wherein the clutch engaging means includes a linkage between the clutch input side and the pivot mounting for said driving lever, said linkage being actuated for engagement of the clutch by rotation of the driving lever for engagement of the clutch during movement of the driven arm through said angle α.

10. Apparatus according to claim 4, wherein the means for rendering the clutch disengaged comprises a spring urging the clutch to the disengaged condition, and wherein the clutch output side is restrained from movement in reverse of that corresponding to movement of the driven lever through said angle α by means yieldingly restraining the output side of the clutch against movement thereof.

11. Apparatus according to claim 2:
(a) the working end of the driving lever being engaged with the driven lever during a segment of each revolution thereof and being disengaged on the driven lever during the remaining segment of each revolution, (b) the pivot mounting for the driving lever including a supporting element for the driving lever, a bore extending through said supporting element, the driving lever being slidably received in said bore, (c) means for securing the driving lever in place in said bore, (d) means for releasing the driving lever for movement in said bore, (e) a driving lever adjustment member positioned for engagement by the driving lever during the disengagement segment of each revolution thereof, and for adjusting the position of the driving lever in said bore, (f) said securing means being operative to secure the driving lever in said bore at the position provided by the adjusting member until disengagement of the working end of the driving lever with the driven lever, (g) said release means providing the driving arm after disengagement of the working end thereof with the driven lever in position for adjustment thereof by the adjustment member, (h) and control means for controlling the position of the adjustment member.

12. Apparatus according to claim 2:
(a) the axis of revolution of the driving lever, and the pivot axis of the driven lever extending horizontally, (b) the working end of the driving lever being engaged with the driven lever during a segment of each revolution thereof, and being disengaged from the driven lever during the remaining segment of each revolution, (c) the pivot mounting for the driving lever including a supporting element for the driving lever, a vertically extending bore through said supporting element, the driving lever being slidably received in said bore, (d) means for securing the driving lever in place in said bore, (e) means for releasing the driving lever for movement in said bore in response to the action of gravity thereon, (f) a driving lever adjustment arm positioned for stopping the fall of the driving lever under the influence of gravity and to thereafter push the driving lever upwardly in said bore to a position corresponding to the position of the adjustment arm, (g) said securing means being operative to secure the driving lever in said bore at the level to which it is pushed by the adjusting arm, until disengagement of the working end of the driving lever with the driven lever, (h) said release means releasing the driving lever after disengagement of the working end thereof with the driven lever for dropping of the driving lever to the adjustment arm, (i) a transducer, (j) means interconnecting said transducer and said adjusting arm for control of the position of the adjusting arm in response to the operation of the transducer.

13. Apparatus according to claim 12, said supporting element having a bore transverse to and intersecting said bore for the driving arm, a pin slidably received in said transverse bore, said pin having a bore aligned with the bore in the supporting element, the driving arm passing through the pin bore in loose-fitting relation, spring means normally urging said pin into engagement with the driving arm to provide said securing means.

14. Apparatus according to claim 13, said release means comprising a lever fulcrumed in said supporting element, in abutting relation with said pin and opposing the force of said spring, and means for actuating said fulcrum to overcome the force of said spring forcing the pin to loose-fitting relation with the driving arm.

15. Apparatus according to claim 12, and including a link arm connected to said adjusting arm to form therewith a bell crank, said control means comprising a linear transducer, a transducer response arm connected to said transducer for linear movement in response to transducer action, and means interconnecting said transducer response arm and said link arm for actuation of the bell crank and therefore of the adjusting arm in response to action of the transducer, and a pivot mounting for the bell crank at the junction of the adjusting arm and the link arm.

16. Apparatus according to claim 15, said means interconnecting the transducer response arm and the link arm including a finger fixedly joined to the transducer response arm and disposed at an angle thereto, a pin mounted on said finger for engagement with the bell crank link arm, said linkage means pin being adjustably mounted on said finger permitting adjustment of the interconnection between said transducer response arm and the bell crank.

17. Apparatus according to claim 16, said bell crank being disposed with respect to said linkage means pin so that the force of gravity urges the link arm of the bell crank into engagement with said linkage means pin.

18. Apparatus according to claim 16, said linkage means pin being formed of magnetic material, said link arm being of material responsive to a magnet, the magnetic force of the linkage means pin maintaining the link arm in engagement with the linkage means pin.

19. Apparatus according to claim 15, said adjusting arm being joined to said link arm to form said bell crank, by an adjustable connection.

20. Apparatus according to claim 12, the driven lever being movable between a fixed first position in which it is disposed for engagement thereof by the driving lever, and a second position corresponding to said angle α, and to which it is moved by the driving lever, the driven lever being released from engagement with the driving lever at said second position for return to said first position, and means for moving the driven lever from said second position back to said first position.

21. Apparatus according to claim 20, said means for moving the driven arm from said second position to said first position including intermeshing toothed gear segments, one of said segments being mounted on the driven lever and the other thereof being mounted on a rocker, a lever arm having a fixed end fixedly secured to said rocker and terminating in a free end, a rocker lever actuating pin mounted on said supporting element for engaging the free end of the rocker lever to actuate the rocker and the intermeshing toothed gear segments for return of the driven arm from the second position to the first position.

22. In combination with a gas meter comprising a vertically extending measuring chamber, an outer casing spaced from the measuring chamber, and a counting mechanism mounted on said casing in a housing therefor at the top portion of the casing, a transmission according to claim 15, said transducer being disposed in the lower corner of said casing between the measuring chamber and the casing, the driving arm and its supporting element and the driven arm and its transmission output means being disposed in said housing, the transmission means being operatively connected to the counting means for the actuation thereof, the bell crank link arm being disposed in said casing between the measuring chamber and the casing, the adjusting arm of the bell crank being disposed in said housing outside of the case, and the pivot axis of the bell crank mounting extending through the casing.

23. Apparatus according to claim 22, the transducer and bell crank link arm being mounted on the inner side of the casing.

24. Apparatus according to claim 22, the outer casing, counting mechanism, and transmission being assembled as a unit for removal and placement on the measuring chamber as a unit.

References Cited by the Examiner

UNITED STATES PATENTS

| 213,553 | 3/1879 | Eastwood | 74—53 |
| 2,438,202 | 3/1948 | Burns | 74—568 |
| 2,534,093 | 12/1950 | Willard | 74—125.5 |
| 2,791,118 | 5/1957 | Holtz | 73—233 |

RICHARD C. QUEISSER, *Primary Examiner.*

BROUGHTON G. DURHAM, J. A. MARSHALL, *Assistant Examiners.*